US012714969B2

(12) United States Patent
Ji et al.

(10) Patent No.: US 12,714,969 B2
(45) Date of Patent: Aug. 25, 2026

(54) FLUE GAS PURIFICATION SYSTEM FOR HAZARDOUS WASTE INCINERATION AND PURIFICATION METHOD

(71) Applicant: CHONGQING GREENING ENVIRONMENTAL PROTECTION CO. LTD, Chongqing (CN)

(72) Inventors: Wei Ji, Chongqing (CN); Xiaodun Niu, Chongqing (CN); Qiujun Shi, Chongqing (CN); Youxiong He, Chongqing (CN); Cong Zhao, Chongqing (CN); Weiwen Gu, Chongqing (CN); Ye Yuan, Chongqing (CN)

(73) Assignee: CHONGQING GREENING ENVIRONMENTAL PROTECTION CO. LTD, Chongqing (CN)

( * ) Notice: Subject to any disclaimer, the term of this patent is extended or adjusted under 35 U.S.C. 154(b) by 323 days.

(21) Appl. No.: 18/409,752

(22) Filed: Jan. 10, 2024

(65) Prior Publication Data

US 2024/0139678 A1 May 2, 2024

Related U.S. Application Data

(63) Continuation of application No. PCT/CN2022/104526, filed on Jul. 8, 2022.

(30) Foreign Application Priority Data

Jul. 16, 2021 (CN) ......................... 202110805574.6
Jul. 16, 2021 (CN) ......................... 202121620947.4

(51) Int. Cl.
*B01D 53/02* (2006.01)
*B01D 53/50* (2006.01)
(Continued)

(52) U.S. Cl.
CPC ........... *B01D 53/75* (2013.01); *B01D 53/504* (2013.01); *B01D 53/78* (2013.01);
(Continued)

(58) Field of Classification Search
CPC ...... B01D 2251/2067; B01D 2251/304; B01D 2251/404; B01D 2253/102;
(Continued)

(56) References Cited

U.S. PATENT DOCUMENTS

2009/0188782 A1* 7/2009 Genuario ............... B01D 53/32 204/157.3
2013/0125463 A1* 5/2013 Chen .......................... C10J 3/20 48/119

FOREIGN PATENT DOCUMENTS

CN 207486806 U * 6/2018
CN 108870405 A 11/2018
(Continued)

OTHER PUBLICATIONS

Translation of CN207486806 (Year: 2018).*

*Primary Examiner* — Christopher P Jones
(74) *Attorney, Agent, or Firm* — Hemisphere Law, PLLC

(57) ABSTRACT

A flue gas purification system for hazardous waste incineration and a purification method are provided. The flue gas purification system includes a cooling deacidification coupling device. The cooling deacidification coupling device includes a reaction tower. A top of the reaction tower is installed with a spraying device, an inlet end of the spraying device is connected to a first liquid inlet pipe and a second liquid inlet pipe, the first liquid inlet pipe and the second liquid inlet pipe are configured to transmit a cooling substance and a deacidification substance. The reaction tower is connected to a gas inlet pipe and a gas outlet pipe. A bottom of the reaction tower is connected to an output pipe configured to output substances generated in the reaction tower.
(Continued)

The spraying device is configured to mix the cooling substance and the deacidification substance with the flue gas.

8 Claims, 3 Drawing Sheets

(51) Int. Cl.
*B01D 53/75* (2006.01)
*B01D 53/78* (2006.01)
*B01D 53/86* (2006.01)
*F23G 5/46* (2006.01)

(52) U.S. Cl.
CPC .......... *B01D 53/8625* (2013.01); *F23G 5/46* (2013.01); *B01D 2253/102* (2013.01); *B01D 2257/302* (2013.01); *B01D 2257/404* (2013.01); *B01D 2258/0291* (2013.01); *F23G 2206/20* (2013.01)

(58) Field of Classification Search
CPC ........ B01D 2257/302; B01D 2257/404; B01D 2257/60; B01D 2257/70; B01D 2258/0291; B01D 53/504; B01D 53/505; B01D 53/56; B01D 53/75; B01D 53/78; B01D 53/8625; F23G 2206/20; F23G 5/46; F23J 15/04; F23J 15/06
See application file for complete search history.

(56) References Cited

FOREIGN PATENT DOCUMENTS

CN 112456797 A 3/2021
CN 216149409 U 4/2022

* cited by examiner

FLUE GAS PURIFICATION SYSTEM FOR HAZARDOUS WASTE INCINERATION AND PURIFICATION METHOD

TECHNICAL FIELD

The present disclosure relates to the technical field of flue gas purification for hazardous waste incineration, and particularly to a flue gas purification system for hazardous waste incineration and a purification method.

BACKGROUND

Hazardous waste refers to waste with hazardous characteristics that has been included in the national hazardous waste list or identified according to national hazardous waste identification standards and methods. Different hazardous wastes are disposed of through methods such as incineration, landfill, physicochemical treatments, and comprehensive utilization based on characteristics of the hazardous waste.

In recent years, with the increasing efforts in disposal of the hazardous waste, the use of hazardous waste incineration has increased significantly. A key of flue gas treatments is to remove acidic gases such as sulfur dioxide ($SO_2$), hydrogen chloride (HCl), and hydrogen fluoride (HF) from the flue gas, especially the $SO_2$. At present, a flue gas purification process using a two-stage wet deacidification method as a core can effectively remove the acidic gases and meet a discharge standard. However, after using the two-stage wet deacidification method, a large amount of high-salinity wastewater is generated, which causes corrosion to equipment. The disadvantages of the flue gas purification process using the two-stage wet deacidification method are as follows.

1) The two-stage wet deacidification method requires a large amount of various deacidification agents such as hydrated lime and liquid alkali, resulting in high production costs.
2) The two-stage wet deacidification method will produce a large amount of high-salinity wastewater. At present, there is no good treatment method for the high-salinity wastewater. The wastewater treatment is difficult and cost is high.
3) The process flow is long, which increases the flow resistance of flue gas, and control of flue gas discharge index is difficult.

Therefore, there is an urgent need to develop a flue gas purification system for hazardous waste incineration, which simplifies existing traditional flue gas purification processes, prevents the generation of a large amount of high-salinity wastewater from resulting in secondary pollution and corrosion of equipment, reduces disposal cost of hazardous waste, and can achieve the recycling of deacidification agents, thereby achieving purposes of energy conservation and environmental protection.

SUMMARY

A purpose of the present disclosure is to provide a flue gas purification system for hazardous waste incineration and a purification method, aiming to simplify existing traditional flue gas purification processes in hazardous waste disposal industries, avoid generation of a large amount of high-salinity wastewater, and improve purification efficiency of the flue gas in the hazardous waste disposal industries.

In order to achieve the above purpose, technical solutions adopted by the present disclosure are as follows.

A cooling deacidification coupling device for hazardous waste incineration flue gas is provided. The cooling deacidification coupling device includes a reaction tower, a spraying device, a first liquid inlet pipe, a second liquid inlet pipe, a gas inlet pipe, a gas outlet pipe, and an output pipe. A top of the reaction tower is installed with the spraying device, an inlet end of the spraying device is connected to the first liquid inlet pipe and the second liquid inlet pipe, the first liquid inlet pipe is configured to transmit a cooling substance, and the second liquid inlet pipe is configured to transmit a deacidification substance. The reaction tower is connected to the gas inlet pipe and the gas outlet pipe. A bottom of the reaction tower is connected to the output pipe configured to output substances generated in the reaction tower. After a flue gas enters the reaction tower, the spraying device is configured to mix the cooling substance from the first liquid inlet pipe and the deacidification substance from the second liquid inlet pipe with the flue gas, thereby achieving purposes of cooling and deacidification.

In an embodiment, the spraying device is a rotary spraying device.

The present disclosure further provides a flue gas purification system for hazardous waste incineration. The flue gas purification system includes the cooling deacidification coupling device.

In an embodiment, the flue gas purification system further includes an incineration device and a heat recovery boiler. The incineration device is connected to the reaction tower through the heat recovery boiler, and a gas outlet end of the heat recovery boiler is connected to a gas inlet end of the gas inlet pipe.

In an embodiment, the flue gas purification system further includes a bag dust-removal device and a flue gas discharge device. The flue gas discharge device is connected to the reaction tower through the bag dust-removal device, and a gas inlet end of the bag dust-removal device is connected to a gas outlet end of the gas outlet pipe.

In an embodiment, the flue gas purification system further includes an alkaline solution preparation-storage device, and a liquid outlet of the alkaline solution preparation-storage device is connected to a liquid inlet of the second liquid inlet pipe.

In an embodiment, the flue gas purification system further includes an activated carbon adsorption device connected between the gas outlet pipe and the bag dust-removal device. A gas inlet end of the activated carbon adsorption device is connected to the gas outlet end of the gas outlet pipe, and a gas outlet end of the activated carbon adsorption device is connected to the gas inlet end of the bag dust-removal device.

In an embodiment, the flue gas purification system further includes a selective non-catalytic reduction (SNCR) denitrification device disposed in the heat recovery boiler.

In an embodiment, the flue gas purification system further includes a dust collection device and a collection device. An inlet end of the dust collection device is connected to an outlet end of the output pipe, a gas discharge end of the dust collection device is connected to an inlet end of the second liquid inlet pipe, and an outlet end of the dust collection device is connected to the collection device.

The present disclosure further provides a purification method of the flue gas purification system. The purification method includes:

step 1: incinerating hazardous waste in the incineration device to generate a flue gas;

step 2: transmitting the flue gas to the heat recovery boiler for SNCR denitrification treatment and heat recovery, thereby obtaining a first treated flue gas;

step 3: transmitting the first treated flue gas from the heat recovery boiler to the gas inlet pipe of the cooling deacidification coupling device, simultaneously cooling the first treated flue gas and removing acidic substances from the first treated flue gas in the cooling deacidification coupling device, thereby obtaining a second treated flue gas; and step 4: transmitting the second treated flue gas to a bag dust-removal device for removing dust and particulate substances from the second treated flue gas, thereby obtaining a third treated flue gas; then discharging the third treated flue gas through a flue gas discharge device.

In an embodiment, the purification method further includes: before transmitting the second treated flue gas to the bag dust-removal device, using an activated carbon adsorption device to remove dioxins and heavy metals from the second treated flue gas. The alkaline solution preparation-storage device is configured to transmit an alkaline solution into the cooling deacidification coupling device.

In an embodiment, the cooling deacidification coupling device is further connected to a dust collection device.

The present disclosure has the following beneficial effects:

1) The first liquid inlet pipe and the second liquid inlet pipe are provided on the reaction tower, the first liquid inlet pipe is configured to transmit the cooling substance, and the second liquid inlet pipe is configured to transmit the deacidification substance (such as the alkaline solution). The spraying device is configured to mix the cooling substance and the deacidification substance with the flue gas, and therefore the cooling deacidification coupling device provided by the present disclosure can achieve the purposes of cooling and deacidification. The flue gas purification system of the present disclosure can avoid the re-synthesis of dioxins and simultaneously achieve the removal of acidic gases, and the flue gas purification system simplifies a process flow of flue gas purification. Solid salts generated in the flue gas purification system are directly discharged through the output pipe at the bottom, which can avoid the generation of a large amount of high-salinity wastewater, simplify the existing flue gas purification process, and solve the problem of the generation of a large amount of high-salinity wastewater that is difficult to treat.

2) In the flue gas purification system provided by the present disclosure, since the incineration device is connected to the heat recovery boiler, the heat in the flue gas can be recovered, the recovered heat can be supplied to internal users of a production line and other users in the factory. The flue gas purification system improves a utilization rate of the heat of the flue gas and avoids loss of the heat of the flue gas.

3) The flue gas purification system further removes dust and particulate substances from the flue gas by installing the bag dust-removal device at the gas outlet end of the reaction tower, which avoids secondary pollution caused by the dust in the flue gas.

4) By installing the activated carbon adsorption device between the gas outlet pipe and the bag dust-removal device, substances such as dioxins and heavy metals that can be adsorbed by activated carbon can be removed from the flue gas.

5) By setting up the dust collection device, after the dust generated in the reaction tower passes through the dust collection device, precipitated substances are directly collected by the collection device, and gases with dust-removal containing some alkaline powder return to the reaction tower, thereby achieving repeated recycling.

6) The purification method of the flue gas purification system provided by the present disclosure uses the cooling deacidification coupling device to efficiently remove acidic gases from the flue gas, solves the problems in a wet deacidification method, and changes a disposal mode using the wet deacidification method as a core. The present disclosure is of great significance in the field of flue gas purification technology of hazardous waste.

DESCRIPTION OF REFERENCE NUMERALS

Figure 1:
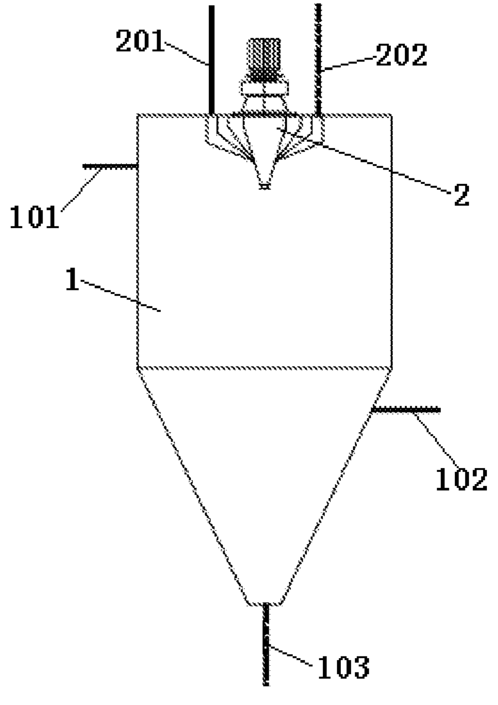
FIG. 1 illustrates a structural schematic diagram of a cooling deacidification coupling device of the present disclosure.

1—reaction tower; 101—gas inlet pipe; 102—gas outlet pipe; 103—output pipe; 2—spraying device; 201—first liquid inlet pipe; 202—second liquid inlet pipe; 3—incineration device; 4—heat recovery boiler; 5—bag dust-removal device; 6—flue gas discharge device; 7—alkaline solution preparation-storage device; 8—activated carbon adsorption device; 9—selective non-catalytic reduction (SNCR) denitrification device; 10—dust collection device; 11—collection device; 12—water supply pipe.

DETAILED DESCRIPTION OF EMBODIMENTS

Embodiments of the present disclosure will be described below with reference to drawings and exemplary embodiments. Those skilled in the art can easily understand advantages and effects of the present disclosure from the content disclosed in this specification. The present disclosure can also be implemented or applied through different specific embodiments, and details in the specification can be modified or changed based on different perspectives and applications without deviating from the spirit of the present disclosure. It should be understood that the exemplary embodiments are only intended to illustrate the present disclosure, and not to limit a scope of protection of the present disclosure.

It should be noted that the drawings provided in the following embodiments only illustrate a basic concept of the present disclosure in a schematic manner, and only components related to basic concept of the present disclosure are shown in the drawings instead of being drawn according to the number, shape and size of components in actual implementation, and the type, number and scale of components in actual implementation can be different, and a layout and types of the components may be more complex.

Embodiment 1

As shown in FIG. 1, a cooling deacidification coupling device for hazardous waste incineration flue gas is provided. The cooling deacidification coupling device includes a reaction tower 1. A spraying device 2 is installed on a top of the reaction tower 1. An inlet end of the spraying device 2 is connected to a first liquid inlet pipe 201 and a second liquid inlet pipe 202, the first liquid inlet pipe 201 is configured to transmit a cooling substance, and the second liquid inlet pipe 202 is configured to transmit a deacidification substance.

The reaction tower 1 is provided with a gas inlet pipe 101 and a gas outlet pipe 102.

A bottom of the reaction tower 1 is provided with an output pipe 103 configured to output substances generated in the reaction tower 1.

After the flue gas enters the reaction tower 1 through the gas inlet pipe 101, the spraying device 2 is configured to spray the cooling substance from the first liquid inlet pipe 201 and the deacidification substance from the second liquid inlet pipe 202 to mix the cooling substance and the deacidification substance with the flue gas, thereby achieving purposes of cooling and deacidification.

The first liquid inlet pipe 201 and the second liquid inlet pipe 202 are provided on the reaction tower 1, the first liquid inlet pipe 201 is configured to transmit the cooling substance, and the second liquid inlet pipe 202 is configured to transmit the deacidification substance (such as the alkaline solution). The spraying device 2 is configured to spray the cooling substance and the deacidification substance to mix them with the flue gas, and therefore the cooling deacidification coupling device provided by the present disclosure can achieve the purposes of cooling and deacidification. The cooling deacidification coupling device of the present disclosure can avoid the re-synthesis of dioxins and simultaneously achieve the removal of acidic gases, which simplifies a process flow of flue gas purification. Solid salts generated in the cooling deacidification coupling device are directly discharged through the output pipe 103 at the bottom, which can avoid the generation of a large amount of high-salinity wastewater, simplify the existing flue gas purification process, and solve the problem of the generation of a large amount of high-salinity wastewater that is difficult to treat.

In the embodiment, the cooling substance in the first liquid inlet pipe 201 is fully mixed with the flue gas after the cooling substance is accelerated by the spraying device 2, which can change a temperature of the flue gas from 550 Celsius degrees (° C.) to below 200° C. within 1 second, so as to achieve the purpose of rapid cooling. The cooling substance can be cooling water or other substance that can be used to reduce the temperature of the flue gas.

Specifically, the spraying device 2 is provided with one liquid outlet, this indicates that after cooling water and an alkaline solution enter the spraying device 2 through two different liquid inlet pipes, the cooling water and the alkaline solution are sprayed from the same liquid outlet, and then the cooling water and the alkaline solution are mixed with the flue gas to simultaneously achieve cooling and deacidification. In actual tests, when the spraying device adopts two liquid outlets, cooling water enters from the first liquid inlet pipe and is sprayed out from one liquid outlet of the spraying device to realize the cooling of the flue gas, the alkaline solution enters from the second liquid inlet pipe and is sprayed out from the other liquid outlet of the spraying device to realize the deacidification of the flue gas, a part of the flue gas will contact with the cooling water first and then contact with the alkaline solution, the other part of the flue gas will contact with the alkaline solution first and then contact with the cooling water, thus there is a time difference between cooling and deacidification of the flue gas. Under a high temperature, when the flue gas contacts with the cooling substance to cool down first and then the cooled flue gas reacts with the alkaline solution for neutralization, a water content in salt generated during the neutralization will increase, which is not conducive to subsequent treatment. In addition, when acidic gases in the flue gas is neutralized with the alkaline solution to form a solid salt, then the solid salt is cooled after contacting with the cooling water, the contact area is significantly reduced, thereby reducing the cooling efficiency.

In the embodiment, the spraying device 2 is a rotary spraying device. Specifically, the spraying device 2 is a rotary spraying device used in a spray dryer absorber (SDA) desulfurization process of low-temperature flue gas desulfurization in steel plants. The rotary spraying device has a rotary speed more than 10000 revolutions per minute (r/min) and a droplet diameter not more than 50 micrometers (μm). An inner diameter of the rotary spraying device can be adjusted according to an actual volume of the flue gas.

In the embodiment, when a concentration of $SO_2$ in the flue gas is 3361 milligrams per standard cubic meter (mg/$Nm^3$), a concentration of $SO_2$ in treated flue gas after the flue gas is treated by the cooling deacidification coupling device in the embodiment can be reduced to below 20 mg/$Nm^3$, and a removal rate of $SO_2$ can reach over 99%.

In the embodiment, a liquid inlet of the first liquid inlet 201 is connected to a water supply pipe 12.

In the cooling deacidification coupling device provided by the present disclosure, since the spraying device 2 has characteristics of large spray volume and is not easy to block, the cooling deacidification coupling device can also treat leachates and other wastewater being difficult in treatment.

Embodiment 2

Figure 2:
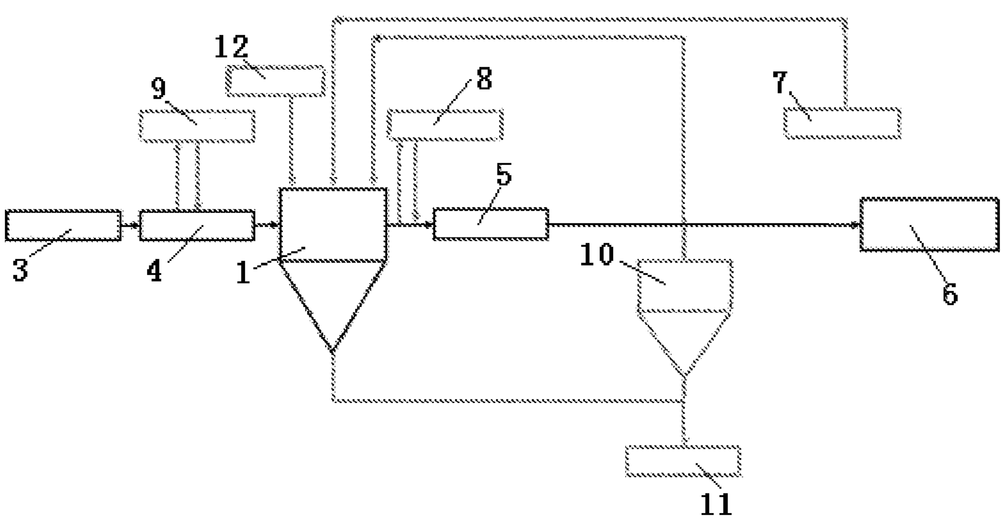
FIG. 2 illustrates a structural schematic diagram of a flue gas purification system for hazardous waste incineration of the present disclosure.

As shown in FIG. 2, a flue gas purification system for hazardous waste incineration is provided in the embodiment, the flue gas purification system includes the cooling deacidification coupling device mentioned in the embodiment 1.

The flue gas purification system further includes an incineration device 3 and a heat recovery boiler 4. The incineration device 3 is connected to the reaction tower 1 through the heat recovery boiler 4, and a gas outlet end of the heat recovery boiler 4 is connected to a gas inlet end of the gas inlet pipe 101.

Since the incineration device 3 is connected to the heat recovery boiler 4, the heat in the flue gas can be recovered, the recovered heat can be supplied to internal users of a production line and other users in the factory. The flue gas purification system improves a utilization rate of the heat of the flue gas and avoids loss of the heat of the flue gas.

The flue gas purification system further includes a bag dust-removal device 5 and a flue gas discharge device 6. The flue gas discharge device 6 is connected to the reaction tower 1 through the bag dust-removal device 5. A gas inlet end of the bag dust-removal device 5 is connected to a gas outlet end of the gas outlet pipe 102.

The flue gas purification system further removes dust and particulate substances from the flue gas by installing the bag dust-removal device 5 at the gas outlet end of the reaction tower 1, which avoids secondary pollution caused by the dust in the flue gas.

The flue gas purification system further includes an alkaline solution preparation-storage device 7, and a liquid outlet of the alkaline solution preparation-storage device 7 is connected to a liquid inlet of the second liquid inlet pipe 202.

In the existing industrial flue gas treatment, a deacidification rate of the flue gas can reach about 98%, but it is not possible to achieve a deacidification rate of 99%.

An activated carbon adsorption device 8 is connected between the gas outlet pipe 102 and the bag dust-removal device 5. A gas inlet end of the activated carbon adsorption device 8 is connected to the gas outlet end of the gas outlet pipe 102, and a gas outlet end of the activated carbon adsorption device 8 is connected to the gas inlet end of the bag dust-removal device 5.

By setting up the activated carbon adsorption device 8 between the gas outlet pipe 102 and the bag dust-removal device 5, the flue gas purification system can remove substances such as dioxins and heavy metals from the flue gas that can be adsorbed by activated carbon.

A selective non-catalytic reduction (SNCR) denitrification device 9 is disposed in the heat recovery boiler 4.

By setting up the SNCR denitrification device 9, a purpose of removing nitrogen oxides is achieved while ensuring full recovery of the heat of the flue gas.

The flue gas purification system further includes a dust collection device 10. An inlet end of the dust collection device 10 is connected to an outlet end of the output pipe 103. A gas discharge end of the dust collection device 10 is connected to an inlet end of the second liquid inlet pipe 202, and an outlet end of the dust collection device 10 is connected to a collection device 11.

By setting up the dust collection device 10, after the dust generated in the reaction tower 1 passes through the dust collection device 10, precipitated substances are directly collected by the collection device 11, and gases with dust-removal containing some alkaline powder return to the reaction tower 1, thereby achieving repeated recycling.

Embodiment 3

Figure 3:
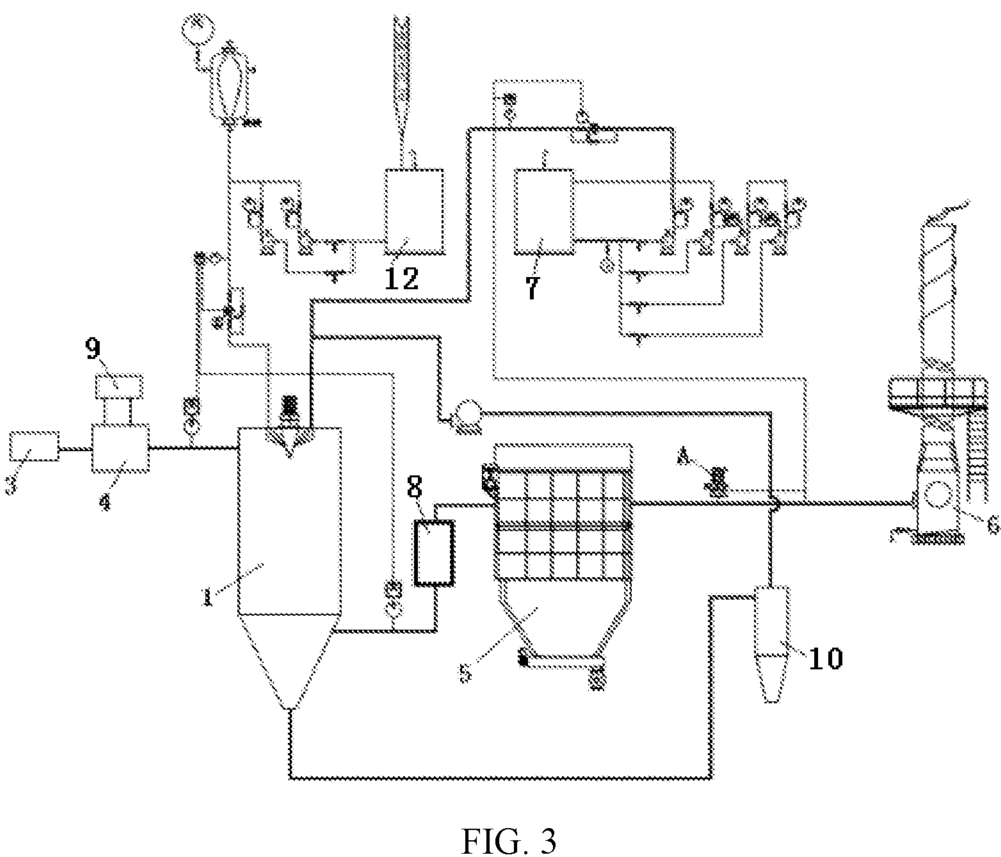
FIG. 3 illustrates a flowchart of a purification method of the flue gas purification system of the present disclosure.

As shown in FIG. 3, a purification method is provided, the purification method uses the flue gas purification system in the embodiment 2 to treat flue gas of hazardous waste incineration. The purification method includes the following steps.

Step 1: After incineration of hazardous waste in the incineration device 3, a high-temperature flue gas is generated. According to measurement of a monitoring device, a concentration of acidic gases in the high-temperature flue gas is 3361 mg/$m^3$, and a temperature of the high-temperature flue gas is in a range of 1100° C. to 1200° C. Furthermore, the acidic gases mainly include $SO_2$, HCl, HF and other acidic gases.

Step 2: The high-temperature flue gas is transmitted to the heat recovery boiler 4 for SNCR denitrification treatment and heat recovery.

Step 3: The temperature of the flue gas after cooling and denitrification by the heat recovery boiler 4 is about 550° C., then the flue gas is transmitted from the heat recovery boiler 4 to the gas inlet pipe 101 of the cooling deacidification coupling device. The flue gas is rapidly cooled down and acidic substances are removed from the flue gas at the same time. Specifically, based on a content of acidic gases in the high-temperature flue gas, in the cooling deacidification coupling device, a rotary speed of the spraying device 2 is set to 10000 r/min, the first liquid inlet pipe 201 transmits cooling water with a flow volume about 3.05 tons per hour (t/h), the second liquid inlet pipe 202 transmits sodium hydroxide (NaOH) solution with a concentration about 30%, and a flow volume of the NaOH solution is 2 $m^3$/h. After the high-temperature flue gas passes through the reaction tower 1 for rapid cooling, the concentration of acid gases in the flue gas discharged from the gas outlet pipe 102 is below 20 mg/$Nm^3$ within 2 seconds, and the temperature of the flue gas is about 200° C. The acid gases contact and react with NaOH efficiently to generate a solid salt. After precipitation of the solid salt, and the solid salt is discharged through the output pipe 103. The cooling water enters the reaction tower 1 to cool down the flue gas rapidly under the efficient rotation of the spraying device 2.

Step 4: The flue gas after cooling and deacidification by the cooling deacidification coupling device is transmitted to the activated carbon adsorption device 8 to adsorb dioxins and heavy metals in the flue gas. Then, the flue gas is transmitted to the bag dust-removal device 5. In the bag dust-removal device 5, the temperature of the flue gas is in a range of 185° C. to 195° C. The bag dust-removal device 5 removes dust and particulate substances from the flue gas. After the content of acidic gases in the flue gas measured by the monitoring device meets the standard, the treated flue gas is discharged from the flue gas discharge device 6.

In the cooling deacidification coupling device, the spraying device 2 makes the alkaline solution and the cooling water form fog drops with a diameter not more than 50 μm under the high-speed rotation, and the purpose of high mass transfer can be achieved by contacting the fog drops with the flue gas, the total evaporation area of the fog drops is large, the evaporation time is short, and the transformation from a liquid phase to a gas phase or a solid phase is realized in the reaction tower 1, so that the purpose of avoiding generation of waste liquid is achieved. The flue gas purification system not only fully meets the requirements of environmental protection, but also avoids the generation of high-salinity wastewater.

By comparing and analyzing the flue gas purification process for hazardous waste incineration in the embodiment with a combined process using a wet deacidification method as a core, the results are as follows.

1) The Removal Effect of an Acidic Gas (Using $SO_2$ as an Example)

In the flue gas purification process disclosed in the embodiment: a removal rate of $SO_2$ can reach 99%, and a content of waste sulfur is 4%;

In the combined process using the wet deacidification method: a removal rate of $SO_2$ can reach 98%, and a content of waste sulfur is 4%.

2) Practicability Analysis

In the flue gas purification process disclosed in the embodiment: the hazardous waste industry has not yet adopted the flue gas purification process as the main treatment process, and the flue gas purification process belongs to innovative technology.

In the combined process using the wet deacidification method: the combined process is the main treatment process in the hazardous waste industry; the combined process can make the discharge of flue gas meet a discharge standard through control, and the combined process is widely applied to upgrading and reconstruction project. However, the combined process generates a large amount of high-salinity wastewater being difficult in treatment, and an evaporation system often undergo a blockage problem.

3) Process Flow

In the flue gas purification process disclosed in the embodiment: 1. SNCR denitrification is provided to improve the removal efficiency of nitrogen oxides; 2. the cooling deacidification coupling device (also has a dry-type alkaline pow recycling system) using SDA as a core is provided, rapid cooling and deacidification functions can be achieved simultaneously, and a deacidification rate is more than 99%; 3. the area of the bag dust-removal device 5 is increased to ensure the removal of particulate substances.

In the combined process using the wet deacidification method: a back end of a bag filter has added two wet towers; the wastewater generated by the wet towers is difficult to treat, and when the wastewater is sprayed back to a quenching tower for evaporation treatment, it increases the frequency of blockage in the quenching tower.

4) Deacidification Effect

In the flue gas purification process disclosed in the embodiment: in a process of rotating spray of the spraying device 2 of the cooling deacidification coupling device, the contact area between the alkaline solution and the flue gas is large, the mass transfer rate is fast, and the purification effect is good.

In the combined process using the wet deacidification method: although the purification effect is good and the removal rate of acidic gases is high, the generated wastewater is difficult to treat and the cost is high.

5) Analysis of Removal Rate when a Content of an Acidic Gas in the Flue Gas is the Same (Taking $SO_2$ as an Example and the Sulfur Content is 1%)

In the flue gas purification process disclosed in the embodiment: an initial concentration of $SO_2$ is 3361 mg/$m^3$, the removal rate of $SO_2$ achieved by the cooling deacidification coupling device is 99%, and the concentration of $SO_2$ at the outlet end of the flue gas discharge device 6 is 20 mg/$m^3$.

In the combined process using the wet deacidification method: an initial concentration of $SO_2$ is 3361 mg/$m^3$, the removal rate of $SO_2$ of dry deacidification is 30%, the removal rate of $SO_2$ of wet deacidification is 99%, and the concentration of $SO_2$ at the outlet end of a flue gas discharge device is 23.5 mg/$m^3$.

6) Analyses of Dosage and Cost

In the flue gas purification process disclosed in the embodiment: urea is used as a reducing agent with a dosage of 2 kilograms per hour (kg/h), and the cost is about 72 yuan per day; powdered activated carbon is used as an adsorbent with a dosage of 10 kg/h, and the cost is about 960 yuan per day; NaOH is used as a deacidifying agent with a dosage of 122 kg/h and the cost of NaOH is about 5856 yuan per day; total cost of chemicals for per ton of hazardous waste is 137.67 yuan per ton.

In the combined process using the wet deacidification method: urea is used as a reducing agent with a dosage of 2 kg/h, and the cost is about 72 yuan per day; powdered activated carbon is used as an adsorbent with a dosage of 10 kg/h, and the cost is about 960 yuan per day; $Ca(OH)_2$ is used as a dry deacidification agent with a dosage of 61.48 kg/h, and the cost is about 738 yuan per day; sodium bicarbonate is used as a dry deacidification agent with a dosage of 102.35 kg/h, and the cost is about 3250 yuan/d; NaOH is used as a wet deacidification agent with a dosage of 74 kg/h, and the cost is about 3552 yuan per day; salt inhibitor is used to reduce the blockage of the quenching tower, a dosage of the salt inhibitor is 2.4 kg/h and the cost is about 4608 yuan per day; total cost of chemicals for per ton of hazardous waste is 198.6 yuan per ton (deacidification with $Ca(OH)_2$) or 248.84 yuan per ton (deacidification with sodium bicarbonate).

7) Analyses of Fly Ash (Salt Containing) Yield and Disposal Cost

In the flue gas purification process disclosed in the embodiment: the fly ash yield is 230.61 kg/h (i.e., 5.45 tons per day), and disposal cost calculated based on landfill cost about 4000 yuan per ton and spread evenly to a single ton of hazardous waste is 436 yuan per ton.

In the combined process using the wet deacidification method: the fly ash yield is 243.34 kg/h (i.e., 5.84 tons per day), and disposal cost calculated based on landfill cost about 4000 yuan per ton and spread evenly to a single ton of hazardous waste is 467.2 yuan per ton.

8) Ability to Treat a Leachate

In the flue gas purification process disclosed in the embodiment: the cooling deacidification coupling device can treat 50 tons of leachate per day and saves cost of 4000 yuan per day.

In the combined process using the wet deacidification method: when the leachate is sprayed back for rapid cooling in the quenching tower, it will cause frequent blockage in the quenching tower, so it cannot be used to treat the leachate.

9) Analysis of Engineering Investment

In the flue gas purification process disclosed in the embodiment: the total investment is about 13 million yuan, including: the cooling deacidification coupling device (about 6 million yuan), a bag filter system (about 2.4 million yuan), a wet deacidification tower system (about 1.5 million yuan), a flue gas heater (about 320000 yuan), an induced draft fan (about 340000 yuan), supporting renovation facilities (about 1.5 million yuan) and installation engineering (about 1 million yuan).

In the combined process using the wet deacidification method: the total investment is about 12 million yuan, including: an emergency cooling tower system (about 2 million yuan), a bag filter system (about 2.4 million yuan), a recirculating fluidized bed system (about 2 million yuan), a two-stage wet deacidification tower system (about 2.4 million yuan), a flue gas heater (about 320000 yuan), an induced draft fan (about 340000 yuan), supporting renovation facilities (about 1.6 million yuan) and installation engineering (about 1 million yuan).

From the above analyses, it can be seen that the flue gas purification process in the embodiment is better than the combined process in terms of process, production cost, and other aspects.

Figure 4:
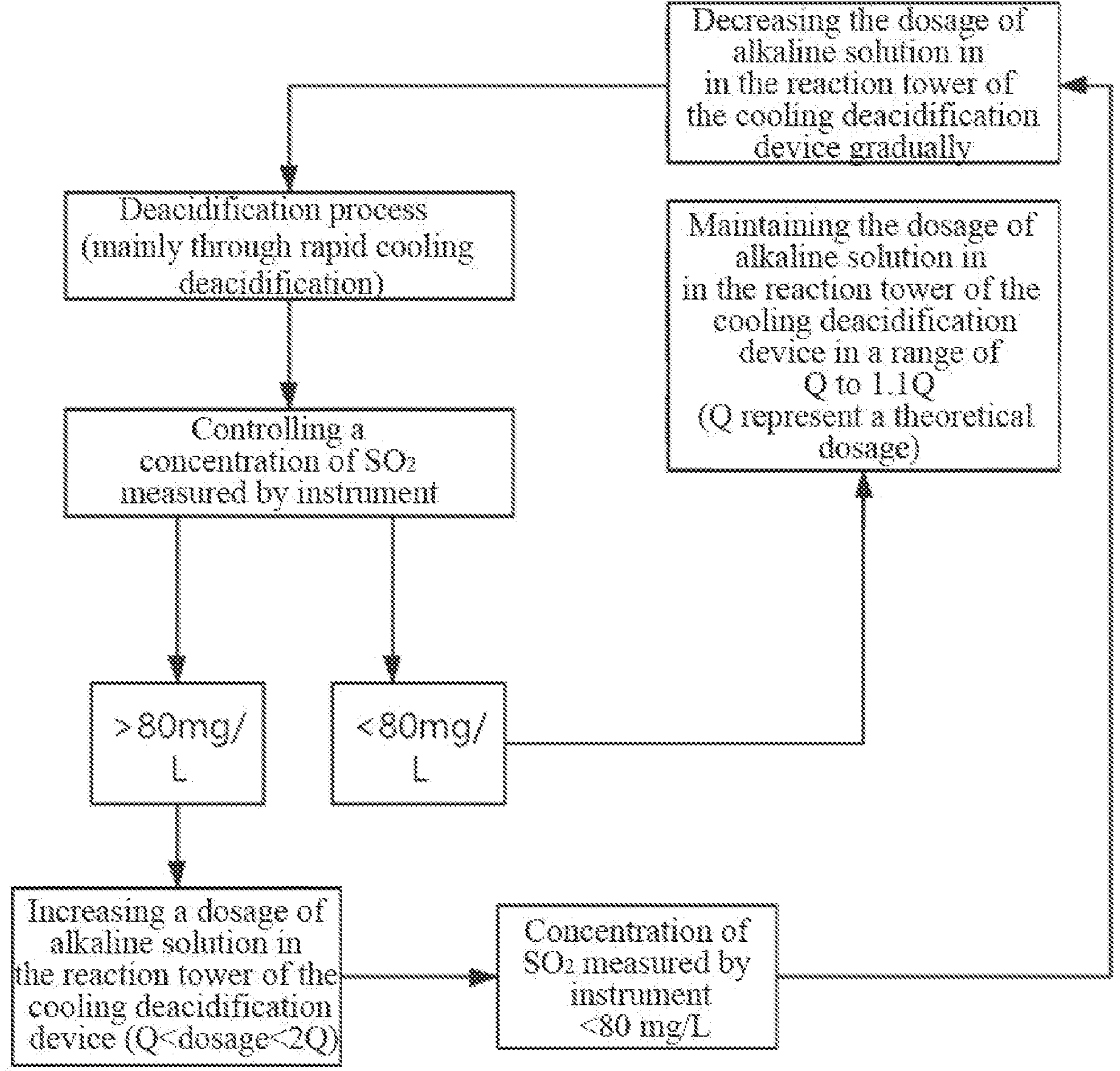
FIG. 4 illustrates an automatic control flowchart of a hazardous waste purification process of the present disclosure.

In the actual process flow of the purification method using the flue gas purification system, the instrument is installed at the inlet end of the flue gas discharge device 6. The instrument is configured to monitor and automatically control the content of $SO_2$ in the flue gas in real-time. An automatic control flowchart of the purification method is shown in FIG. 4.

Furthermore, for example, when a concentration of acidic gases in the flue gas in the embodiment 3 is 3361 mg/$m^3$ and the concentration of acidic gases in the flue gas needs to be reduced to below 20 mg/$Nm^3$, and a dosage of 30% alkaline solution used in the cooling deacidification coupling device is calculated to be Q=2.93 tons per day. In the actual process, the dosage (Q=2.93 tons per day) of alkaline solution is taken as a theoretical dosage, when the content of acidic gases detected in an instrument is below 80 milligrams per liter (mg/L) (national discharge standard), the alkaline solution dosage under the automatic control is maintained in a range of 1 to 1.1 times of the theoretical dosage; and when the content of acidic gases measured by the instrument is greater than 80 mg/L (national discharge standard), the alkaline solution dosage under the automatic control is maintained in a range of Q to 2Q. Until the content of acidic gases measured by the instrument is less than 80 mg/L, the dosage of alkali solution in the cooling deacidification coupling device will be gradually reduced under the automatic control.

In conclusion, firstly, in the flue gas purification system provided by the present disclosure, the first liquid inlet pipe 201 and the second liquid inlet pipe 202 are provided on the reaction tower 1, the first liquid inlet pipe 201 is configured to transmit the cooling substance, and the second liquid inlet pipe 202 is configured to transmit the deacidification substance (such as the alkaline solution). The spraying device 2 is configured to mix the cooling substance and the deacidification substance with the flue gas, and therefore the cooling deacidification coupling device provided by the present disclosure can achieve the purposes of cooling and deacidification. The flue gas purification system of the present disclosure can avoid the re-synthesis of dioxins and simultaneously achieve the removal of acidic gases, and the flue gas purification system simplifies a process flow of flue gas purification. Solid salts generated in the flue gas purification system are directly discharged through the output pipe 103 at the bottom, which can avoid the generation of a large amount of high-salinity wastewater, simplify the existing flue gas purification process, and solve the problem of the generation of a large amount of high-salinity wastewater that is difficult to treat.

Secondly, in the cooling deacidification coupling device, the spraying device 2 makes the alkaline solution and the cooling water form fog drops with a diameter not more than 50 μm under the high-speed rotation, and the purpose of high mass transfer can be achieved by contacting the fog drops with the flue gas, the total evaporation area of the fog drops is large, the evaporation time is short, and the transformation from a liquid phase to a gas phase or a solid phase is realized in the reaction tower 1, so that the purpose of avoiding generation of waste liquid is achieved. The flue gas purification system not only fully meets the requirements of environmental protection, but also avoids the generation of high-salinity wastewater.

In the flue gas purification system provided by the present disclosure, firstly since the incineration device 3 is connected to the heat recovery boiler 4, the heat in the flue gas can be recovered, the recovered heat can be supplied to internal users of a production line and other users in the factory. The flue gas purification system improves a utilization rate of the heat of the flue gas and avoids loss of the heat of the flue gas. Secondly, the flue gas purification system further removes dust and particulate substances from the flue gas by installing the bag dust-removal device 5 at the gas outlet end of the reaction tower 1, which avoids secondary pollution caused by the dust in the flue gas. Thirdly, by installing the activated carbon adsorption device 8 between the gas outlet pipe 102 and the bag dust-removal device 5, substances such as dioxins and heavy metals that can be adsorbed by activated carbon can be removed from the flue gas. Finally, by setting up the dust collection device 10, after the dust generated in the reaction tower 1 passes through the dust collection device 10, precipitated substances are directly collected by the collection device 11, and gases with dust-removal containing some alkaline powder return to the reaction tower 1, thereby achieving repeated inner recycling.

The purification method of the flue gas purification system provided by the present disclosure uses the cooling deacidification coupling device to efficiently remove acidic gases from flue gas, solves the problems in the wet deacidification method, and changes a disposal mode using the wet deacidification method as a core. The present disclosure is of great significance in the field of flue gas purification technology of hazardous waste.

The above embodiments are only exemplary embodiments for fully explaining the present disclosure, and a scope of protection of the present disclosure is not limited to this. Any equivalent replacements or modifications made by those skilled in the art on the basis of the present disclosure is within the scope of protection of the present disclosure.

What is claimed is:

1. A flue gas purification system for hazardous waste incineration, comprising: a cooling deacidification coupling device for hazardous waste incineration flue gas; wherein the cooling deacidification coupling device comprises: a reaction tower (1), a spraying device (2), a first liquid inlet pipe (201), a second liquid inlet pipe (202), a gas inlet pipe (101), a gas outlet pipe (102), and an output pipe (103);

wherein a top of the reaction tower (1) is installed with the spraying device (2), an inlet end of the spraying device (2) is connected to the first liquid inlet pipe (201) and the second liquid inlet pipe (202), the first liquid inlet pipe (201) is configured to transmit a cooling substance, and the second liquid inlet pipe (202) is configured to transmit a deacidification substance; and the spraying device (2) is provided with a liquid outlet, and the liquid outlet of the spraying device (2) is configured to spray out a mixture of the cooling substance and the deacidification substance after the cooling substance enters the spraying device (2) through the first liquid inlet pipe (201) and the deacidification substance enters the spraying device (2) through the second liquid inlet pipe (202);

wherein the reaction tower (1) is connected to the gas inlet pipe (101) and the gas outlet pipe (102);

a bottom of the reaction tower (1) is connected to the output pipe (103) configured to output solid salts generated in the reaction tower (1);

wherein the flue gas purification system further comprises: an incineration device (3), a heat recovery boiler (4) and a selective non-catalytic reduction (SNCR) denitrification device (9);

wherein the incineration device (3) is connected to the reaction tower (1) through the heat recovery boiler (4), and a gas outlet end of the heat recovery boiler (4) is connected to a gas inlet end of the gas inlet pipe (101); the selective non-catalytic reduction (SNCR) denitrification device (9) is disposed in the heat recovery boiler (4);

wherein the spraying device (2) is configured to mix the cooling substance from the first liquid inlet pipe (201) and the deacidification substance from the second liquid inlet pipe (202) with a flue gas after the flue gas enters the reaction tower (1), thereby achieving cooling and deacidification simultaneously in the reaction tower (1); and wherein the flue gas purification system further comprises a dust collection device (10) and a collection device (11); an inlet end of the dust collection device (10) is directly connected to an outlet end of the output pipe (103), an outlet end of the dust collection device (10) is connected to the collection device (11), and a gas discharge end of the dust collection device (10) is connected to an inlet end of the second liquid inlet pipe (202); and the dust collection device (10) is configured to return gases with dust-removal containing alkaline powder to the reaction tower (1), thereby achieving repeated recycling.

2. The flue gas purification system as claimed in claim 1, wherein the flue gas purification system further comprises: a bag dust-removal device (5) and a flue gas discharge device (6); the flue gas discharge device (6) is connected to the reaction tower (1) through the bag dust-removal device (5); and a gas inlet end of the bag dust-removal device (5) is connected to a gas outlet end of the gas outlet pipe (102).

3. The flue gas purification system as claimed in claim 2, wherein the flue gas purification system further comprises: an alkaline solution preparation-storage device (7), and a liquid outlet of the alkaline solution preparation-storage device (7) is connected to a liquid inlet of the second liquid inlet pipe (202).

4. The flue gas purification system as claimed in claim 2, wherein the flue gas purification system further comprises: an activated carbon adsorption device (8) connected between the gas outlet pipe (102) and the bag dust-removal device (5); a gas inlet end of the activated carbon adsorption device (8) is connected to the gas outlet end of the gas outlet pipe (102), and a gas outlet end of the activated carbon adsorption device (8) is connected to the gas inlet end of the bag dust-removal device (5).

5. A purification method using the flue gas purification system as claimed in claim 1, comprising:

step 1: incinerating hazardous waste in the incineration device (3) to generate a flue gas;

step 2: transmitting the flue gas to the heat recovery boiler (4) for SNCR denitrification treatment and heat recovery, thereby obtaining a first treated flue gas;

step 3: transmitting the first treated flue gas from the heat recovery boiler (4) to the gas inlet pipe (101) of the cooling deacidification coupling device, simultaneously cooling the first treated flue gas and removing acidic substances from the first treated flue gas in the cooling deacidification coupling device, thereby obtaining a second treated flue gas; and step 4: transmitting the second treated flue gas to a bag dust-removal device (5) for removing dust and particulate substances from the second treated flue gas, thereby obtaining a third treated flue gas;

then discharging the third treated flue gas through a flue gas discharge device (6).

6. The purification method as claimed in claim 5, further comprising: before transmitting the second treated flue gas to the bag dust-removal device (5), using an activated carbon adsorption device (8) to remove dioxins and heavy metals from the second treated flue gas.

7. The flue gas purification system as claimed in claim 1, wherein the spraying device (2) is a rotary spraying device, the spraying device (2) is configured to rotate at a rotary speed more than 10,000 revolutions per minute (r/min), and a droplet diameter of the spraying device (2) is not more than 50 micrometers (μm).

8. The purification method as claimed in claim 5, further comprising:

controlling, when a content of acidic gases detected in the third treated flue gas is below 80 milligrams per liter (mg/L), a dosage of alkaline solution in the reaction tower (1) maintained in a range of 1-1.1 times a theoretical dosage of the alkaline solution, wherein the theoretical dosage of the alkaline solution is 2.93 tons per day;

increasing, when the content of the acidic gases detected in the third treated flue gas is greater than 80 mg/L, the dosage of the alkaline solution in the reaction tower (1) in a range of 1-2 times the theoretical dosage of the alkaline solution until the content of the acidic gases detected in the third treated flue gas is less than 80 mg/L, and gradually decreasing the dosage of the alkaline solution in the reaction tower (1).

* * * * *